April 24, 1951  E. J. PAZDERNIK  2,550,083
SPRING TRAILER COUPLER
Filed April 8, 1948
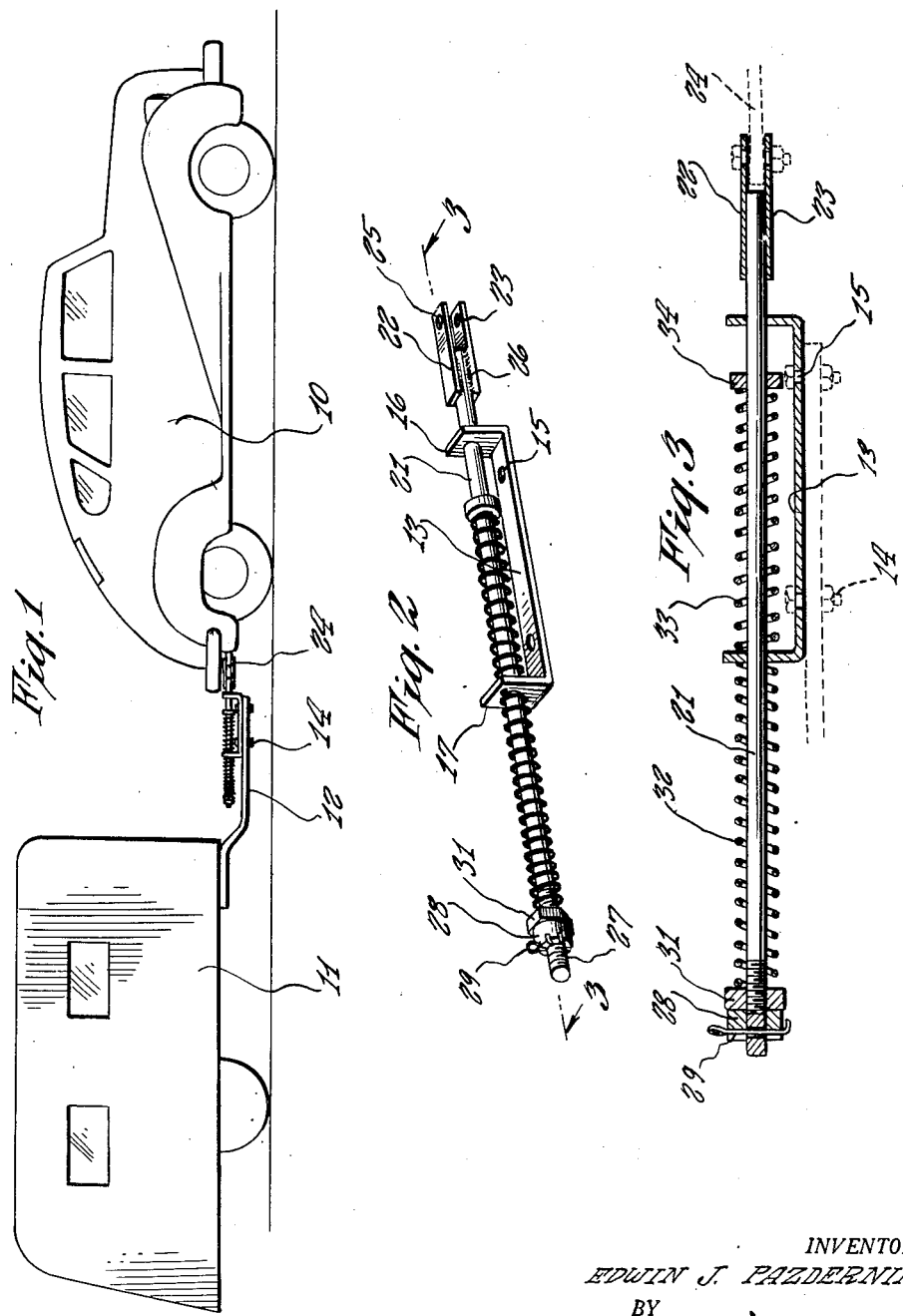
INVENTOR.
EDWIN J. PAZDERNIK
BY
Carl Miller
ATTORNEY Patented Apr. 24, 1951

2,550,083

UNITED STATES PATENT OFFICE 2,550,083

SPRING TRAILER COUPLER

Edwin J. Pazdernik, Campbell, Minn.

Application April 8, 1948, Serial No. 19,803

2 Claims. (Cl. 280—33.9)

This invention relates to a spring trailer coupler.

It is an object of the present invention to provide a spring trailer coupler adapted for the connection of a trailer to an automobile whereby the trailer will be kept positioned relative to the automobile by spring cushioning means operable upon opposite sides of a member and tending at all times to keep the member centralized on a pull shaft which is connected to the automobile.

Other objects of the present invention are to provide a spring trailer coupler which is of simple construction, inexpensive to manufacture, easy to install between the automobile and the trailer, and efficient in operation.

For other objects and for a better understanding of the invention, reference may be had to the following detailed description taken in connection with the accompanying drawing, in which Fig. 1 is a side elevational view of an automobile and a trailer with the hitch or trailer coupler of the present invention connected therebetween.

Fig. 2 is a perspective view of the trailer coupler detached from the trailer and from the automobile.

Fig. 3 is an enlarged sectional view taken in line 3—3 of Fig. 2.

While this hitch or trailer coupler is shown attached between an automobile and a cabin or house trailer, which may be two or four wheels, it will be understood that this hitch can be used between an automobile and an ordinary wagon type of trailer or between a tractor and a farm implement.

Referring now to the figures, 10 represents an automobile or tractor to which there is to be attached a trailer 11. The trailer or implement 11 has a forwardly extending tongue 12 to which a hitch plate 13 is connected by bolts 14 extended through the plate and through the tongue. The plate 13 has holes 15 for receiving the bolts 14. The hitch plate has its ends turned up as indicated at 17 and 18 and has openings therein through which may slide a hitch rod 21 having plates 22 and 23 attached thereto at its forward end and spaced so that the same can be connected to a hitch bar 24 on the automobile and made secure thereon by the extension of a bolt through holes 25. The plates 22 and 23 are attached to opposite sides of the rod 21 by welding material as indicated at 26.

The rear end of the rod 21 is threaded as indicated at 27 and is adapted to receive a nut 28 which can be held against rotation by a cotter pin 29 extending through a slot in the nut and through the rod end. A nut 31 can be adjusted to vary the spring tension of a balance spring 32 disposed on the rod 21 rearwardly of the bent up portion 17. On the rod at the opposite side of the bent up portion 17 is another balance spring 33 adapted to react against a collar 34 fixed upon the rod. The springs 32 and 33 will maintain the bent up portion of the hitch plate 13 at a center position. Accordingly, a resilient hitch is provided. Whether the automobile or tractor is extended forwardly or rearwardly, a spring cushioning effect will be provided at the hitch connection.

The springs are made of such strength that there will be very little compression of the same upon effecting the movement of the trailer by the automobile 10.

While various changes may be made in the detail construction, it shall be understood that such changes shall be within the spirit and scope of the present invention as defined by the appended claims.

Having thus set forth and disclosed the nature of my invention, what is claimed is:

1. A spring trailer coupler or hitch comprising a hitch plate having upwardly bent ends, a rod extending through the ends of the hitch plate for sliding movement relative thereto, means for attaching one end of the rod to a tractor, means for connecting the said hitch plate to a trailer, an inner balance spring disposed on the rod between the said upwardly bent ends of the hitch plate abutting one of its ends at one of the said bent up ends of the hitch plate and means permanently secured to the said rod against which the other end of the inner balance spring may react, and an outer balance spring disposed on the rod abutting one of its ends at the opposite side of said one of the said bent up ends and means disposed adjacent the other end of the rod against which the other end of the outer balance spring may react, the said means permanently secured to the rod lying in the space within the bent up ends of the hitch plate and upon rupture of the outer of the springs adapted to engage the other bent up portion of the hitch plate, whereby the said means is permanently secured to the rod and thereby the latter may lock with the other bent up portion to assume the pull of the trailer upon breakage of the outer spring.

2. A connection comprising a hitch plate adapted to be connected to a trailer, said hitch plate having upwardly extending portions, a rod adjustable through the upwardly extending portions having means adapted for the attachment of the same to an automobile, an inner balance spring disposed on the rod between the said upwardly extending portions abutting one of its ends at one of the said upwardly extending portions and a collar permanently secured to the said rod against which the other end of the inner balance spring may react, and an outer balance spring disposed on the rod abutting one of its ends at the opposite side of said one of the said upwardly extending portions, and an adjustable nut arrangement on the rod against which the outer balance spring may react, the said collar lying in the space within the upwardly extending portions and upon rupture of the outer of the springs adapted to engage the other upwardly extending portion, whereby the collar and, thereby, the rod may lock with the other upwardly extending portion to assume the pull of the trailer upon breakage of the outer spring.

EDWIN J. PAZDERNIK.

REFERENCES CITED

The following references are of record in the file of this patent:

UNITED STATES PATENTS

| Number | Name | Date |
| --- | --- | --- |
| 1,276,548 | Litten | Aug. 20, 1918 |
| 1,289,141 | Ferris | Dec. 31, 1918 |
| 1,356,076 | Litten | Oct. 19, 1920 |
| 2,057,658 | Bryant | Oct. 20, 1936 |